United States Patent [19]

Butterfield

[11] 4,429,595

[45] Feb. 7, 1984

[54] MOTION TRANSMITTING DEVICE

[75] Inventor: Roger P. Butterfield, Freeville, N.Y.

[73] Assignee: Emerson Electric Co., St. Louis, Mo.

[21] Appl. No.: 199,788

[22] Filed: Oct. 23, 1980

[51] Int. Cl.³ .............................................. F16H 1/28
[52] U.S. Cl. ...................................... 74/804; 74/640; 74/805
[58] Field of Search ......................... 74/804, 640, 805

[56] References Cited

U.S. PATENT DOCUMENTS

| 702,793 | 6/1902 | Hamann | 74/804 |
|---|---|---|---|
| 1,365,492 | 1/1921 | Hatlee | 74/804 |
| 1,867,492 | 7/1932 | Braren | 74/804 |
| 1,870,875 | 8/1932 | Scheuer | 74/805 |
| 2,475,504 | 7/1949 | Jackson | 74/804 |
| 2,520,282 | 8/1950 | Henry | 74/804 |
| 2,861,481 | 11/1958 | Sundt | 74/804 |
| 3,472,097 | 10/1969 | Huska | 74/805 |
| 3,668,858 | 6/1972 | Hartwig | 74/804 |
| 4,023,440 | 5/1977 | Kennington et al. | 74/804 |
| 4,050,331 | 9/1977 | Braren | 74/804 |
| 4,194,415 | 3/1980 | Kennington et al. | 74/804 |
| 4,271,726 | 6/1981 | Ryffel | 74/804 |

FOREIGN PATENT DOCUMENTS

| 354350 | 6/1922 | Fed. Rep. of Germany | 74/804 |
|---|---|---|---|
| 1349898 | 12/1963 | France | 74/804 |
| 52-50457 | 4/1977 | Japan | 74/804 |

*Primary Examiner*—Lawrence J. Staab
*Assistant Examiner*—Joseph M. Rolnicki
*Attorney, Agent, or Firm*—Polster, Polster and Lucchesi

[57] ABSTRACT

A motion transmitting means comprising an eccentrically supported carrier means which upon rotation of the eccentric, orbits such that devices carried thereby in equal spacing engage the teeth of a concentric and fixed internal toothed gear means, the load carrying engagement being substantially of an arc of approximately 90° of the teeth, and means to translate orbiting motion to rotary output motion. The number of gear teeth exceeds by one or more the number of devices which engage the gear teeth.

3 Claims, 7 Drawing Figures

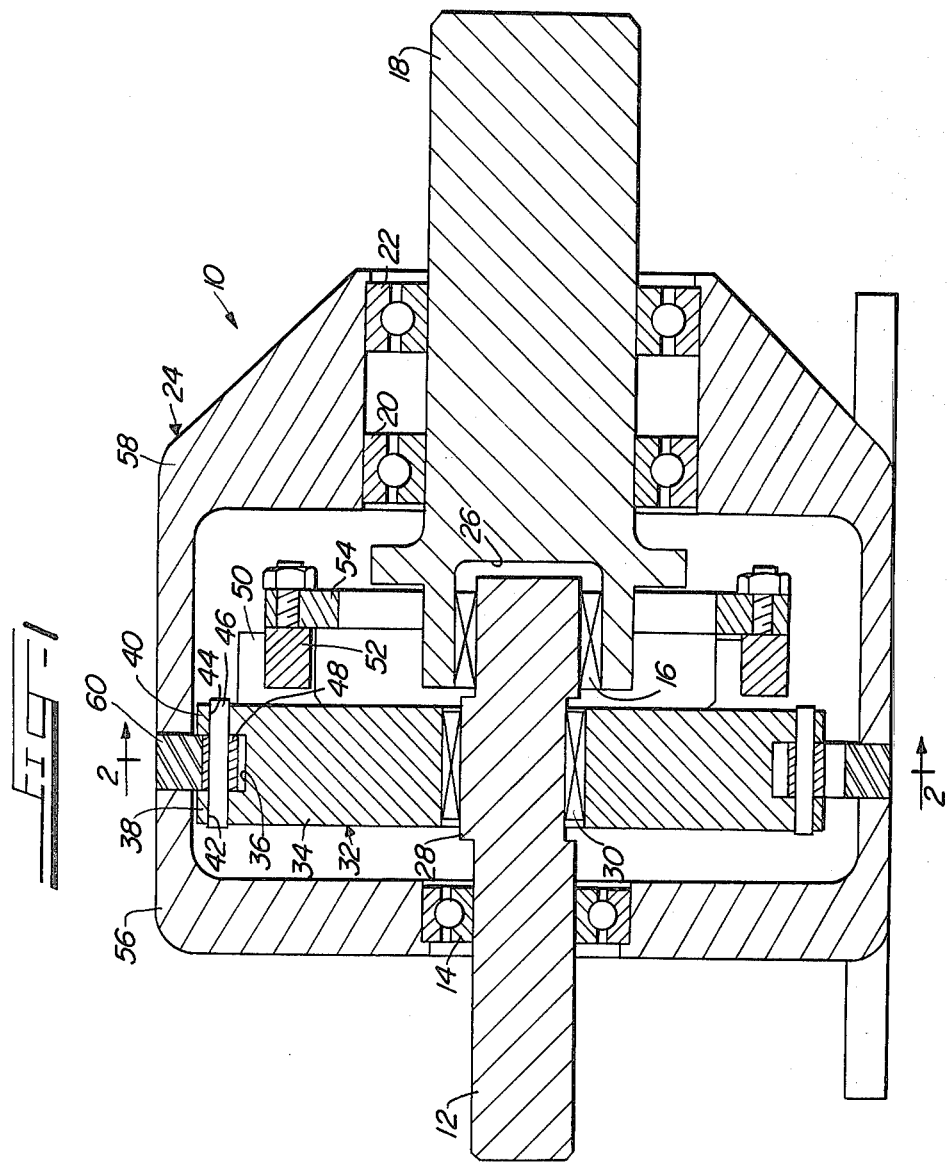

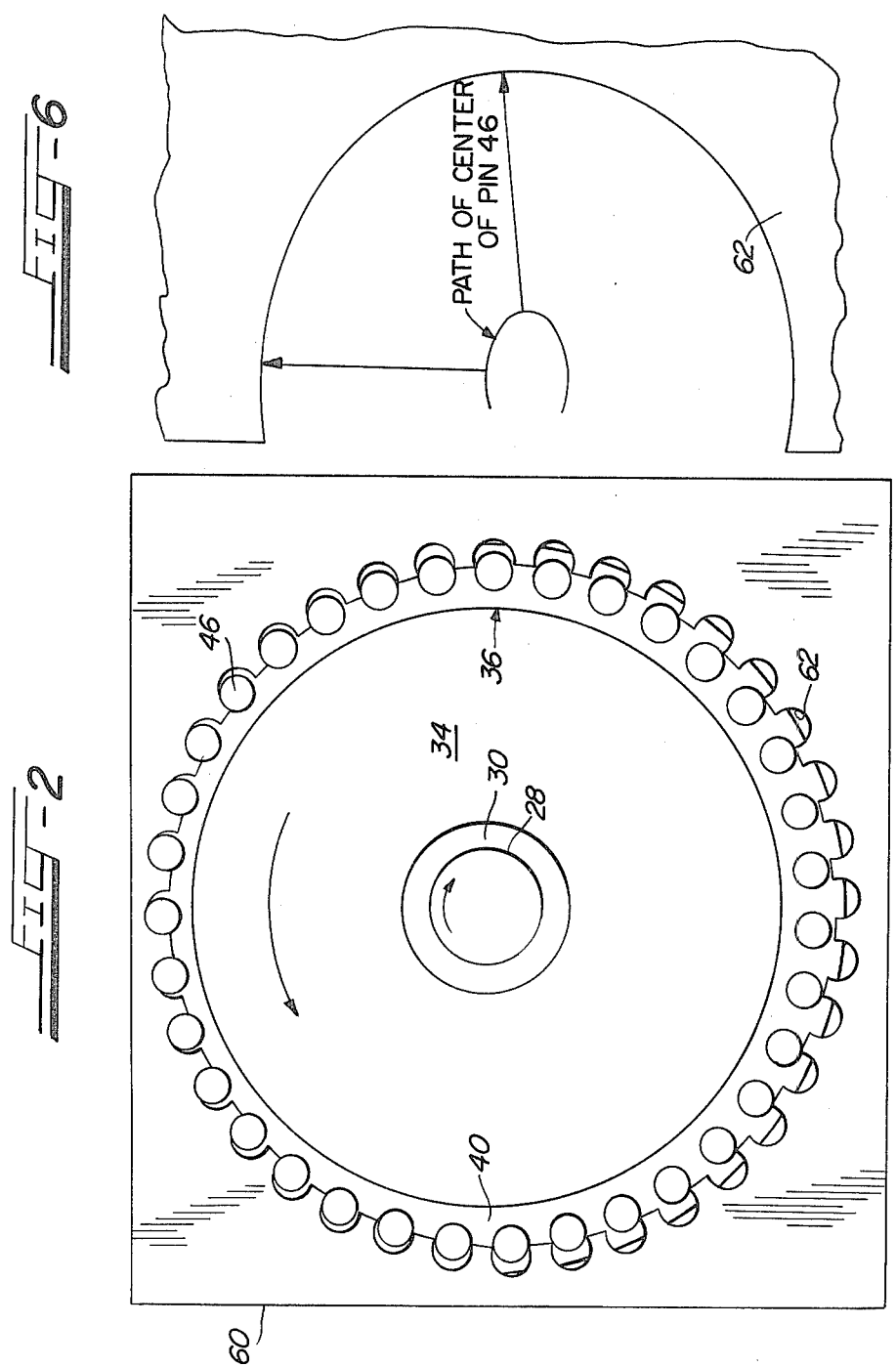

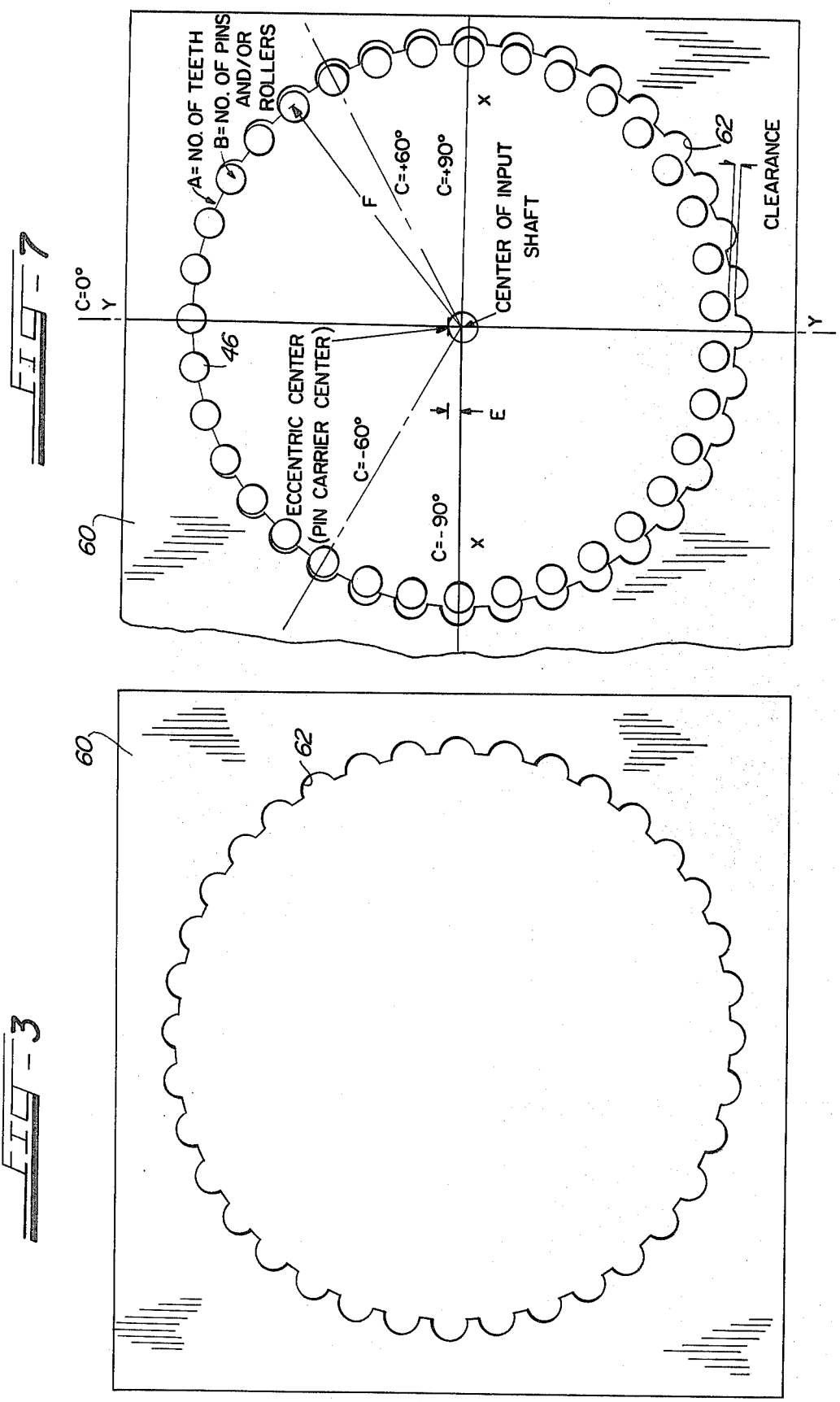

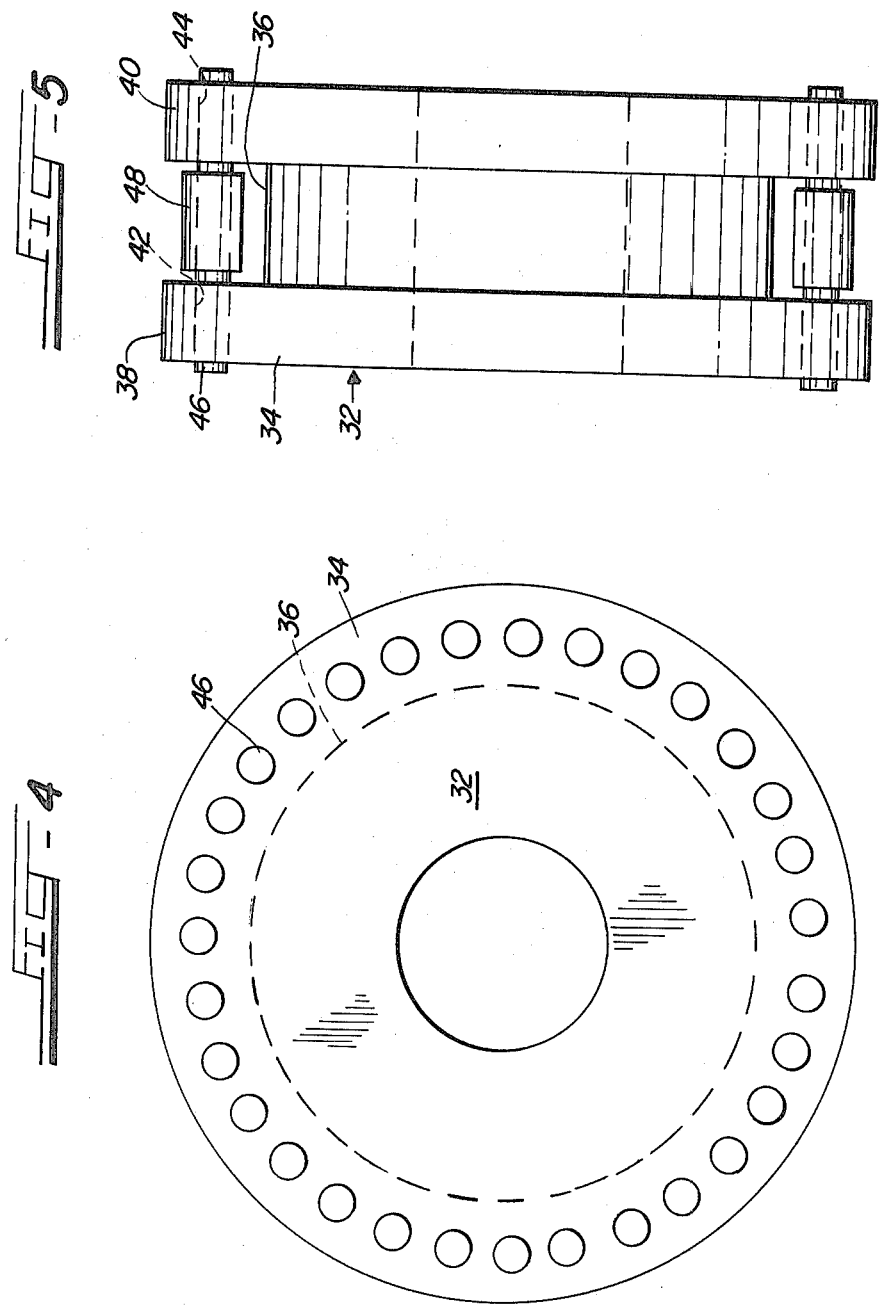

MOTION TRANSMITTING DEVICE

BACKGROUND OF THE INVENTION

Motion transmitting devices using various combinations of concentrically and eccentrically mounted and rotatable means to provide speed differentials between shafts are known in the art. Many use an internal toothed gear and a meshing eccentric gear, the teeth of which mesh with a portion of the teeth of the internal toothed gear when the eccentrically mounted gear is caused to orbit. In many of these devices a relatively few teeth carry load which limits the torque capacity of the device. Because of the sliding motion of the teeth, friction losses and heat build-up occur causing wear and a reduction in the useful life of the device. Others use an eccentrically mounted gear which meshes with fixed pins arranged in a cylindrical array, the major axis of which is concentric with a shaft carrying an eccentric for the gear. In this device there is sliding motion between the fixed pins and the gear teeth causing increased friction, the build-up of heat and reduced life of the device. Also, few elements carry the load, resulting in a low torque carrying device.

In a more recent development, the teeth of an eccentric external gear mesh with the pins of a chain, the chain following a wobbling path as the gear orbits. The gear has at least one less tooth than the chain has pins. The chain remains generally in one location, its movement being limited by openings into which the chain pins extend, the openings being located in capturing plates which may define at least part of the housing of the device. The eccentric motion is translated into rotary motion at the output of the device, as is the case with the other discussed devices. One advantage in the last described device is the torque carrying tooth-pin engagement through an arc of approximately 90°.

SUMMARY OF THE INVENTION

An improved motion transmitting device comprising a pin carrier which carries a plurality of equally spaced pins, which carrier orbits within a stationary, internally toothed, ring gear. The pin carrier is eccentrically mounted on an input shaft, so that as the input shaft rotates, the pin carrier essentially rolls around the internally toothed gear. The pins roll into and out of engagement with the teeth of the gear, generally through an arc of approximately 180° at any given time; torque or load carrying engagement is though an arc of approximately 90°. The pin carrier follows an orbital path, and a coupling changes the eccentric motion to pure rotation which is transmitted to an output shaft. When the number of teeth of the gear exceeds the number of pins on the carrier, the device acts as a speed reducer, the reduction ratio being expressed as follows:

Reduction ratio $= N/(N-M)$ where:
N = number of pins (or rollers)
M = number of teeth of the internal gear A special tooth form, the equation for which is disclosed herein, permits a plurality of pins and teeth to be in engagement at any time, so as to provide a high load carrying device.

The drive can function as a speed multiplier by reversing the described input and output shafts.

DRAWINGS OF THE INVENTION

FIG. 1 is a longitudinal section through a motion transmitting means according to this invention;

FIG. 2 is a sectional view on line 2—2 of FIG. 1;

FIG. 3 is an elevational view of the internal toothed gear of this invention;

FIGS. 4 and 5 are detailed views of the pin carrier of the invention;

FIG. 6 is an enlarged illustration of a tooth form for the gear of this invention showing its generation; and FIG. 7 is an illustration of pin-gear relationships usable in generating the tooth form for the gear.

DETAILED DESCRIPTION OF THE INVENTION

Looking now at FIG. 1, the motion transmitting means of this invention is identified by the reference character 10 and comprises an inpur shaft 12 journaled in bearings 14 and 16 and an output shaft 18 journaled in bearings 20 and 22. The bearings 14, 20 and 22 are supported by a multiple part housing, generally identified as 24, while the bearing 16 is supported in a recess 26 in the output shaft. The shafts 12 and 18 are coaxial with one another.

The shaft 12 has an eccentric portion 28 about which is journaled, by a bearing 30, a pin carrier 32, details of which are shown in FIGS. 4 and 5. The pin carrier is supported for free rotation about the eccentric portion 28, and generally comprises a circular plate 34 having an annular groove 36 to provide a pair of flange-portions 38 and 40. The flange-like portions 38 and 40 are provided with aligned, equally spaced openings 42 and 44, each pair of aligned openings receiving and supporting a pin 46. The pins 46 can be freely rotatable in the openings or can each be provided with a freely rotatable roller 48. A plurality of radially oriented lugs 50 extend from the carrier 32 (not shown in FIG. 5) and engage lugs 52 connected to an annular member 54 which is coupled by lugs in the same manner to the shaft 18. The lugs 50 and 52 slide radially relative to one another while rotating, thus converting the eccentric motion of the pin carrier to rotary motion for the output shaft. The coupling structure just described is essentially an Oldham coupling for translating orbital motion to rotary motion; i.e., the output from the motion transmitting device. Other types of coupling devices can be used without departing from the spirit of the invention.

The housing 24, in the illustrated embodiment, is constructed of two parts 56 and 58 and supports an internal toothed gear 60 between the parts. The pitch circle of the gear 60, which gear is more fully illustrated in FIGS. 2 and 3, is concentric with the axes of the shafts 12 and 18. The gear 60 is provided with at least one more tooth 62 than there are pins 46 carried by the carrier 32. As noted in FIG. 2, the pins 46 (or rollers 48) of the eccentric mounted carrier engage the teeth of the gear 60 generally through an arc of approximately 180° and for carrying torque through at least an arc of approximately 90°.

Rotation of the input shaft 12 in one direction results in rotation of the eccentric portion 28 and causes orbital motion of the pin carrier 32 in the opposite direcion. The latter is caused by the pins 46 and their rollers 48, if such are provided, to roll into and out of engagement with teeth of the stationary or fixed internal gear 60. Generally the gear teeth are engaged by pins through an arc of 180°; however, torque is carried by the engaging pins and teeth through an arc of approximately 90°. The orbital motion is translated into rotary motion to the output shaft 18 by the coupling comprising the engaing lugs 50 and 52 and the annular member 54. With the operation as described and a difference between the number of pins and gear teeth, the device is a speed reducer; if the functions of the shafts are reversed, i.e., the output shaft 18 is rotated, then the device will operate as a speed increaser.

According to another aspect of the invention, the internal gear can be made in two parts thus facilitating the assembly of the device. The housing can be used as a sump for lubricating oil; each pin will pass through the sump on each output revolution, insuring sufficient lubrication of the device under all conditions.

High torque capacity can be achieved with the device of this invention by the choice of pin size and materials of construction, i.e., larger pin size and high strength materials provide higher torque capacity.

One of the features of this invention is the form of the teeth 62 of the internal gear 60. The tooth form is formed by creating equal radii from a set of points. These points represent the center of a pin at the different positions that it occupies within the tooth form. FIG. 6 illustrates the tooth form in a larger scale than FIG. 3, and also indicates the pin center path, as noted:

If X-Y coordinates are used (see FIG. 7), the coordinates of the pin centers for the typical tooth form are generated from the following formulas:

$$X = E \cos C + F \cos\left(\left[\frac{A}{B} - 1\right] \times C\right)$$

$$Y = E \sin C - F \sin\left(\left[\frac{A}{B} - 1\right] \times C\right)$$

Where:
- A = the number of gear teeth
- B = the number of pins and/or rollers
- E = the eccentricity of the input shaft
- F = the pitch radius of the pin carrier
- C = the angle of the pin relative to the eccentricity.

The tooth form is then made by plotting a line, following a path which at all locations is an equal distance from the generated pin center path (as illustrated in FIG. 6). The minimum and maximum values of the angle C are determined, so that there is sufficient clearance between the teeth and the pins or rollers on the non-engaged portion of the drive mechanism.

I claim:

1. A motion transmitting device comprising:

an input shaft and a coaxial output shaft;
an eccentric connected to said input shaft;
a circular carrier suppported by and rotatable about said eccentric such that its periphery follows an orbital path upon rotation of said eccentric;
a fixed internal gear surrounding said carrier, said gear having a plurality of equally spaced teeth defined between spaces having a shape of a part of an ovoid, the defining pitch circle of said teeth being concentric with the axes of said shafts;
a plurality of equally spaced engaging means supported by said carrier with at least a portion of each being freely rotatable about its support axis, each engaging means sequentially engaging each of said teeth defining spaces and rolling on at least a portion of the defining surface thereof, the number of teeth being greater than the number of engaging means by at least one;
some of said engaging means being in torque transmitting engagement with the teeth for substantially an arc of 90° of said gear at any given time;
said gear teeth form being determined by plotting equal radii from a set of points representing the support axis of an engaging means at different positions occupied within a tooth space, the X-Y coordinates of the engaging means support axis being generated by the equations $$X = E \cos C + F \cos\left(\left[\frac{A}{B} - 1\right] \times C\right)$$

$$Y = E \sin C - F \sin\left(\left[\frac{A}{B} - 1\right] \times C\right)$$

where
- A = the number of gear teeth
- B = the number of engaging means
- E = the eccentricity of the input shaft
- F = the pitch radius of the carrier
- C = the angle of the engaging means relative to the eccentricity and joining the plotted points; and coupling means between the carrier and the output shaft for translating orbital motion from said carrier to rotary motion to said output shaft.

2. A motion transmitting device as recited in claim 1 in which said engaging means comprise fixed pins each supporting a roller.

3. A motion transmitting device as recited in claim 1 in which said engaging means comprise pins journaled for rotation in said carrier.

* * * * *